H. E. SANDERS & E. R. TALLEY.
DEVICE FOR CONTROLLING AUTOMOBILE HEADLIGHTS.
APPLICATION FILED DEC. 4, 1915.
1,199,617.
Patented Sept. 26, 1916.
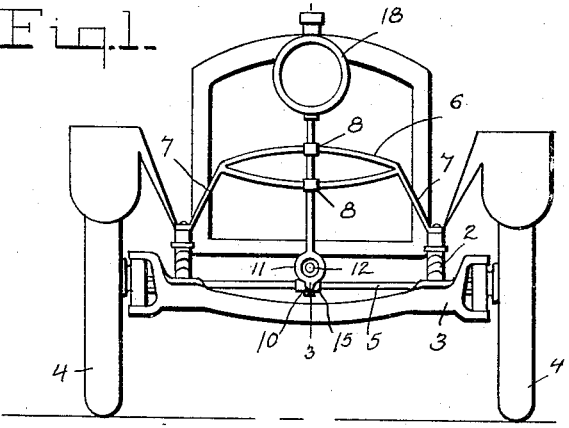
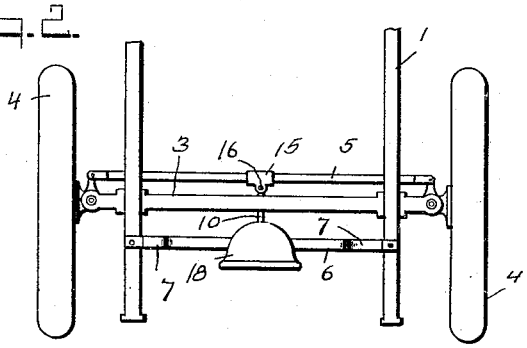
Witnesses
R. M. Jones
Inventors
H. E. Sanders & E. R. Talley
By
Attorney

UNITED STATES PATENT OFFICE.

HARRY E. SANDERS AND EDWIN R. TALLEY, OF GRINNELL, IOWA.

DEVICE FOR CONTROLLING AUTOMOBILE-HEADLIGHTS.

1,199,617. Specification of Letters Patent. Patented Sept. 26, 1916.

Application filed December 4, 1915. Serial No. 65,036.

*To all whom it may concern:*

Be it known that we, HARRY E. SANDERS and EDWIN R. TALLEY, citizens of the United States, residing at Grinnell, in the county of Poweshiek and State of Iowa, have invented certain new and useful Improvements in Devices for Controlling Automobile-Headlights; and we do hereby declare the following to be a full, clear, and exact description of the invention, such as will enable others skilled in the art to which it appertains to make and use the same.

This invention relates to new and useful improvements in a dirigible headlight and its primary object is to provide an extremely simple and practical dirigible or automatic headlight for vehicles, which will turn with the steering mechanism so as to throw its rays always in the path of the vehicle.

A further object of this invention is the provision of novel means of supporting a headlight directly in front of a machine, so that the movement of the steering mechanism will move the light in either direction, and will illuminate both paths of the front wheels at all times, thus eliminating the employment of two headlights on each side of a vehicle.

A further object of this invention is the provision of an enlarged portion having an opening therein, formed on the lower end of the lamp standard to form a bearing to receive a crank handle of an automobile to support the lower end of the lamp standard in vertical alinement with the supporting means for holding the upper end of a lamp standard to an automobile.

With these and other objects in view as will become more apparent as the description proceeds, the invention consists in certain novel features of construction, combination and arrangement of parts as will be hereinafter more fully described and claimed.

For a complete understanding of our invention reference is to be had to the following description and accompanying drawings, in which, Figure 1 is a front elevation of an automobile, equipped with our improved headlight, Fig. 2 is a top plan view illustrating the connection of the lamp standard to a connecting rod of the front wheels, Fig. 3 is a side sectional elevation taken on the line 3—3 of Fig. 1.

Referring in detail to the drawing by numerals, 1 designates an automobile chassis being supported at its forward end on springs 2 mounted on an axle 3. The steering wheels 4 are controlled by the longitudinally movable connecting rod 5, which moves in a direction opposite to that in which the vehicle turns.

In carrying out our invention, we provide a lamp support consisting of an elliptical body portion 6 provided at its end with downwardly and laterally extending supporting and attaching arms 7 which are secured to the front ends of the chassis 1 by any suitable means. The elliptical body portion 6 is provided with bearings 8 intermediate its length to receive a lamp standard 9, which will be hereinafter more fully described.

The lamp standard 9 is of substantially L-shape form to provide an operating arm 10 and is rotatably mounted within the bearings 8 of the elliptical body portion 6. The lamp standard is provided with an enlarged portion 11 intermediate its ends having a central opening 12 therein to receive a crank handle of an automobile of a well known type to support the lower end of the lamp standard 9 in vertical alinement with the bearings 8. The operating arm 10 of the lamp standard 9 is provided with a flattened end to receive the forked arms 14 of a cylindrical sleeve 15 which is secured to the connecting rod 5 intermediate its length. The forked arms 14 are pivotally secured to the operating arm 10 by means of a bolt 16 having a nut 17 on the end thereof, whereby when the connecting rod 5 is moved in one direction longitudinally of the chassis 1, the operating arm 10 is moved in the same direction turning the lamp standard in the opposite direction.

A headlight 18 of any desired type is provided with a socket 19 to receive and be supported by the upper end of the lamp standard 9. The lamp standard 9 is of a length to support the headlight 18 approximately in horizontal alinement with the top edge of the radiator of an automobile to which our invention is applied, so as to reflect the rays of light sufficiently ahead of the automobile to cover both paths of the front wheels, thus eliminating the employment of two headlights upon both sides of an automobile.

From the foregoing description taken in connection with the accompanying drawing, it will be seen that when the connecting rod 5 is shifted to the left to turn the vehicle to the right, the lamp standard 9 will be rotated an amount corresponding to the movement of the connecting rod and cause the lamp to throw its rays directly in the path of the vehicle.

While we have shown and described the preferred embodiment of our invention, it will be understood that minor changes in construction, combination and arrangement of parts may be made without departing from the spirit and scope of the invention as claimed. Especially do we reserve the right to use two head lights, controlled in the same manner.

Having thus described our invention, what we claim is:

1. A dirigible headlight mechanism comprising an elliptical body portion, downwardly and laterally extending supporting arms secured to the ends of said body portion, and attached to the chassis of an automobile, bearings formed in said body portion, a lamp standard rotatably mounted in said bearings, means for supporting the lower end of said standard in vertical alinement with said bearings, a headlight carried by said standard and means for connecting said standard to a connecting rod of an automobile.

2. A dirigible headlight mechanism comprising an elliptical body portion, downwardly and laterally extending supporting arms secured to the ends of said body portion, and attached to the chassis of an automobile, bearings formed in said body portion intermediate its ends, a lamp standard journaled in said bearings and provided with a headlight on one end thereof, an enlarged portion formed on said lamp standard intermediate its length and provided with a central aperture therein to receive a crank handle of an automobile to support the lower end of the lamp standard in a vertical alinement with said bearings, and means for connecting the lamp standard to a connecting rod of an automobile.

3. A dirigible headlight mechanism comprising an elliptical body portion, means for securing said body portion to a chassis of an automobile and supporting it in front of a radiator of an automobile, bearings formed in said body portion, a lamp standard rotatably mounted in said bearings, means for supporting the lower end of said standard in vertical alinement with the bearings, a headlight secured to the standard, an operating arm secured to the standard and provided with a flattened end having an aperture therein, a sleeve provided with forked arms secured to the flattened end of said arms, said sleeve rigidly secured to a connecting rod of an automobile to turn the lamp standard in an opposite direction from the longitudinal movement of said connecting rod.

In testimony whereof we affix our signatures in presence of two witnesses.

HARRY E. SANDERS.
EDWIN R. TALLEY.

Witnesses:
WILL C. RAYBURN,
EDITH W. KENDALL.

Copies of this patent may be obtained for five cents each, by addressing the "Commissioner of Patents, Washington, D. C."